United States Patent Office 2,781,402
Patented Feb. 12, 1957

2,781,402
ARYL SULFONES AND METHOD OF PRODUCING SAME

David H. Chadwick, Anniston, Ala., assignor to Monsanto Chemical Company, St. Louis, Mo., a corporation of Delaware No Drawing. Application October 30, 1952,
Serial No. 317,839

10 Claims. (Cl. 260—607)

The present invention relates to aromatic sulfones and to an improved method of preparing same.

The primary object of the invention is to provide a novel and economically practical method of making aromatic sulfones.

Another object of the invention is to provide a method of making aromatic sulfones in which only a relatively small amount of an aluminum chloride catalyst is required as compared to prior art methods employing this catalyst.

An additional object of the invention is to provide a method of making aromatic sulfones in which equivalent product yields are obtained with substantially smaller amounts of an aluminum chloride catalyst than is required by prior art methods.

A further object of the invention is to provide a method of making aromatic sulfones involving the use of an aluminum chloride catalyst in substantially less than equimolecular quantities.

A still further object of the invention is to provide a method of making aromatic sulfones in which a mixed catalyst containing aluminum chloride is employed in substantially less than equimolecular quantities.

Other objects and advantages will become apparent to those skilled in the art as the description of the invention unfolds.

Heretofore, aromatic sulfones have been prepared by reacting aryl sulfonyl halides with aryl hydrocarbons in the presence of a metal catalyst such as aluminum chloride. This reaction proceeds in accordance with the following equation:

$$RSO_2X + R'H \rightarrow RSO_2R' + HX$$

wherein R and R' are selected from the group consisting of aryl hydrocarbon-, alkaryl hydrocarbon-, halogenated aryl- and nitroaryl-radicals and X is selected from the group consisting of chlorine, bromine and iodine. However, in the case of aluminum chloride, it has always been the practice to use 1 mol of aluminum chloride per mole of $RSO_2X$ since these materials form a complex which reacts with the aryl hydrocarbon or substituted aryl hydrocarbon to produce the desired sulfone. Apparently the resulting sulfone forms a more tightly bound complex with the aluminum chloride than the aryl sulfonyl halide and, therefore, at the temperatures (45° C.–50° C.) normally employed, the aluminum chloride is not available for effecting further reaction between the above-mentioned materials. Consequently, prior to this invention, it has been considered essential to use one mol of aluminum chloride for each mol of sulfonyl halide in order to obtain aryl sulfones in satisfactory yields. (See Rec. trav. Chim. 35, 166, 1915.)

Notwithstanding the teachings of the prior art, I have discovered that aryl sulfonyl halides may be reacted with aryl hydrocarbons or the alkyl-, halogenated or nitro-derivatives thereof, in the presence of catalytic amounts of $AlCl_3$, to form the corresponding sulfones provided the reaction is carried out at elevated temperatures. More specifically, I have found that if this reaction is effected at a temperature of at least 80° C. up to a temperature at which substantial decomposition of the resulting sulfone is avoided, aryl sulfones are obtained in substantially quantitative yields. The use of elevated temperatures in this reaction presumably causes the sulfone-aluminum chloride complex to partially break down and regenerate the aluminum chloride so that it can catalyze a further reaction between the above-mentioned reactants. This operation, which is repeated over and over until the reaction has gone to completion, may be represented by the following equations:

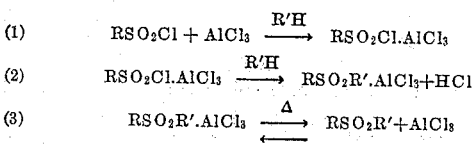

The present method of producing aryl sulfones represents a distinct advance in the art since it involves the use of less catalyst without reduction in product yield and, therefore, greater simplicity in the recovery of the final product, all of which add up to a more economical and more commercially attractive method than the prior art methods which employ equimolecular amounts of aluminum chloride.

The invention is further illustrated by the following examples, the parts being by weight.

Example I

About 592 parts of para-toluenesulfonyl chloride and about 985 parts of xylene were placed in an agitated flask and 422 parts of aluminum chloride added portionwise over a period of one hour. The reaction was executed under substantially anhydrous conditions and at a temperature in the range of about 45° C. to about 60° C. The time required to carry the reaction substantially to completion was about 1½ hours. At the end of the reaction, the product was hydrolyzed with cold hydrochloric acid and allowed to separate into two layers, namely, an aqueous layer and an organic layer. After separating these layers, the organic layer was washed with 6 N HCl, water, 10% NaOH and 15% sodium chloride. The washed product was then subjected to fractional distillation and tolyl xylyl sulfone was recovered in a yield corresponding to 92% of theory, basis para-toluenesulfonyl chloride.

Example II

Approximately 382 parts of para-toluenesulfonyl chloride and about 742 parts of xylene were reacted together, with stirring, in the presence of about 87.5 parts of aluminum chloride. The reaction was carried out under substantially anhydrous conditions and at temperatures ranging from about 42° C. up to about 120° C.; however, during the greater part of the reaction, the temperature fell within the range of about 107° C. to about 120° C. During this reaction, rapid evolution of hydrogen chloride occurred and continued with diminishing strength until the reaction had gone substantially to completion. The reaction product was hydrolyzed with cold concentrated hydrochloric acid and allowed to separate into two layers, namely, an aqueous layer and an organic layer. After separating these layers by means of a separatory funnel, the organic layer was washed with 6 N HCl, 5% NaOH, and with water. The washed product was thereupon subjected to fractional distillation and tolyl xylyl sulfone was recovered in a yield corresponding to 91.1% of theory, basis para-toluenesulfonyl chloride.

Example III 96 parts of para-toluenesulfonyl chloride and 222 parts of xylene were heated under substantially anhydrous conditions to about 90° C. in the presence of about 13 parts of stannic chloride. As no reaction occurred, 10 parts of aluminum chloride was added and the reaction mixture heated to about 110° C. At this temperature, the evolution of hydrogen chloride was initiated, thus indicating that the desired reaction was taking place. This temperature was maintained until no more hydrogen chloride was evolved, whereupon the reaction mixture was cooled and hydrolyzed in cold concentrated hydrochloric acid to form an aqueous layer and an organic layer. The organic layer was separated from the aqueous layer and washed. The washed organic product was then fractionally distilled and tolyl xylyl sulfone (boiling point, 200–212° C. at 2 mm. Hg.) was recovered in a yield corresponding to about 91% of theory, basis para-toluene sulfonyl chloride.

These examples demonstrate that, notwithstanding the teachings of the prior art, aryl sulfones may be produced in excellent yields by reacting aryl sulfonyl halides with aryl hydrocarbons at elevated temperatures in the presence of catalytic amounts of aluminum chloride.

In the practice of the instant invention, the reaction of aryl sulfonyl halides with aryl hydrocarbons or the alkyl-, halogenated- and nitro-substituted derivatives thereof is executed at a temperature of at least 80° C. but below that temperature at which substantial decomposition of the sulfone occurs. More specifically, the reaction is carried out at a temperature within the range of about 90° C. to about 225° C., and preferably within the range of about 110° C. to about 150° C.

The aluminum chloride catalyst is employed in substantially less than equimolecular amounts based on the aryl sulfonyl halide content of the initial reaction mixture. More particularly, it is used in catalytic amounts which may vary within the range of about 0.10 to about 0.80 and preferably in the range of about 0.25 to about 0.33 mol of aluminum chloride per mol of aryl sulfonyl halide. If desired, the catalyst may be substituted in part by other salts such as stannic chloride, zinc chloride, and similar well known salts which are used in Friedel-Crafts' condensation reactions.

The aryl sulfonyl halides and aryl hydrocarbons or the abovementioned substituted derivatives thereof may be employed in substantially equimolecular proportions, but it is preferred to use a sufficiently large excess of the second-mentioned reactant to provide a reaction medium which serves as a solvent for the reaction product, thereby facilitating removal of by-product hydrogen halides and recovery of the aryl sulfone without the introduction of another component.

Although the working examples have been restricted to the production of tolyl xylyl sulfone, the method of the instant invention is by no means limited thereto as it may be used to make aryl and substituted aryl sulfones generally. Thus, in a similar manner, suitable aryl sulfonyl halides or substituted aryl sulfonyl halides may be reacted with the appropriate aryl hydrocarbons or substituted hydrocarbons to form phenyl sulfone, p-tolyl sulfone, o-tolyl phenyl sulfone, p-tolyl phenyl sulfone, phenyl α-naphthyl sulfone, β-naphthyl sulfone, 1,8-bis(phenylsulfonyl) naphthalene, 1,5-bis(phenylsulfonyl) naphthalene, 4-biphenyl sulfone, 4-biphenyl phenyl sulfone, 1,3-bis(phenylsulfonyl) benzene, 4-phenoxyphenyl phenyl sulfone, 3-phenylsulfonyl-dibenzofurane, 2-chlorophenyl phenyl sulfone, 4-chlorophenyl sulfone, 2-chlorophenyl 4-chlorophenyl sulfone, 2-chlorophenyl 3,4-dichlorophenyl sulfone, 2-chlorophenyl 2,5-dichlorophenyl sulfone, 4-chlorophenyl 3,4-dichlorophenyl sulfone, 3,4-dichlorophenyl sulfone, 3-nitrophenyl sulfone, 3-nitrophenyl 4-chlorophenyl sulfone, 3-nitrophenyl 3,4-dichlorophenyl sulfone, 3-nitrophenyl 2,5-dichlorophenyl sulfone, 2-chloro- 5-nitrophenyl sulfone, 3-nitro-4-chlorophenyl sulfone, and 2-methyl-5-nitrophenyl sulfone.

It is to be understood that the invention is not limited by the specific examples hereinabove set forth as they are illustrative only. The invention is limited solely by the appended claims.

What I claim is:

1. The method of preparing aryl sulfones, which comprises reacting an aryl sulfonyl halide with at least equimolecular proportions of a compound selected from the group consisting of aryl hydrocarbons and the alkyl-, halogenated- and nitro-substituted derivatives thereof, said reaction being carried out at a temperature of at least 80° C. but below that temperature at which substantial decomposition of the sulfone occurs and in the presence of from about 0.1 mol up to substantially less than equimolecular amounts of aluminum chloride, basis aryl sulfonyl halide.

2. The method of preparing aryl sulfones, which comprises reacting an aryl sulfonyl chloride with at least equimolecular proportions of a compound selected from the group consisting of aryl hydrocarbons and the alkyl-, halogenated- and nitro-substituted derivatives thereof, said reaction being carried out at a temperature of at least 80° C. but below that temperature at which substantial decomposition of the sulfone occurs and in the presence of about 0.1 to about 0.33 mol of aluminum chloride, basis aryl sulfonyl chloride.

3. The method of producing aryl sulfones defined in claim 2, in which the reaction is carried out at a temperature within the range of about 90° C. to about 225° C.

4. The method of producing aryl sulfones defined in claim 2, in which the reaction is carried out at a temperature within the range of about 110° C. to about 150° C.

5. The method of producing aryl sulfones defined in claim 1, in which the catalyst is employed in an amount which falls within the limits of about 0.10 to 0.80 mol of aluminum chloride per mol of aryl sulfonyl halide.

6. The method of producing aryl sulfones defined in claim 2, in which the catalyst is employed in an amount which falls within the limits of about 0.25 to about 0.33 mol of aluminum chloride per mol of aryl sulfonyl chloride.

7. The method of producing tolyl xylyl sulfone, which comprises reacting at a temperature within the range of about 90° C. to about 225° C. para-toluenesulfonyl chloride with xylene in the presence of about 0.33 mol of aluminum chloride per mol of para-toluenesulfonyl chloride.

8. The method of producing tolyl xylyl sulfone, which comprises reacting at a temperature within the range of about 110° C. to about 150° C. para-toluenesulfonyl chloride with xylene in the presence of a mixed catalyst containing aluminum chloride and stannic chloride, said catalyst being employed in an amount which falls within the limits of about 0.25 to about 0.33 mol, basis para-toluenesulfonyl chloride.

9. The method of producing tolyl xylyl sulfone, which comprises reacting at elevated temperatures para-toluenesulfonyl chloride with xylene in the presence of about 0.25 mol of a mixed catalyst containing aluminum chloride and stannic chloride, basis para-toluene sulfonyl chloride.

10. The method of producing aryl sulfones defined in claim 2, in which the second-mentioned reactant is employed in an amount exceeding equimolecular proportions.

References Cited in the file of this patent

UNITED STATES PATENTS 2,224,964     Huismann     Dec. 17, 1940

OTHER REFERENCES

Beckurts: Ber. der Deut. Chem. Ges., vol. 11 (1878), page 2067.

Ullman et al.: Ber. der Deut. Chem. Ges., vol. 38 (1905), page 734.

Willgerod et al.: "Jour. Prak. Chem.," vol 193 (1912), page 199.